(12) United States Patent
Yamasaki et al.

(10) Patent No.: US 9,748,603 B2
(45) Date of Patent: Aug. 29, 2017

(54) SULFIDE SOLID ELECTROLYTE MATERIAL, BATTERY, AND PRODUCING METHOD FOR SULFIDE SOLID ELECTROLYTE MATERIAL

(71) Applicant: TOYOTA JIDOSHA KABUSHIKI KAISHA, Toyota-shi, Aichi-ken (JP)

(72) Inventors: Hisatsugu Yamasaki, Gotenba (JP); Yuki Kato, Susono (JP); Takamasa Ohtomo, Susono (JP); Masatsugu Kawakami, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 15/024,989

(22) PCT Filed: Sep. 17, 2014

(86) PCT No.: PCT/JP2014/074566
§ 371 (c)(1),
(2) Date: Mar. 25, 2016

(87) PCT Pub. No.: WO2015/049987
PCT Pub. Date: Apr. 9, 2015

(65) Prior Publication Data
US 2016/0240886 A1 Aug. 18, 2016

(30) Foreign Application Priority Data
Oct. 2, 2013 (JP) .................................. 2013-207569

(51) Int. Cl.
*H01M 2/14* (2006.01)
*H01M 10/0562* (2010.01)
(Continued)

(52) U.S. Cl.
CPC ......... *H01M 10/0562* (2013.01); *H01B 1/10* (2013.01); *H01M 10/0525* (2013.01); *H01M 2300/0068* (2013.01)

(58) Field of Classification Search
CPC ..................................................... H01M 2/14
See application file for complete search history.

(56) References Cited

U.S. PATENT DOCUMENTS

2012/0301796 A1\* 11/2012 Ohtomo ............ H01M 10/0562
429/322
2013/0040208 A1    2/2013 Kanno et al.
2014/0363745 A1   12/2014 Hirayama et al.

FOREIGN PATENT DOCUMENTS

| JP | 2010-199033 A | 9/2010 |
| JP | 2013-149599 A | 8/2013 |
| WO | 2011/118801 A1 | 9/2011 |

\* cited by examiner

*Primary Examiner* — Jacob Marks
(74) *Attorney, Agent, or Firm* — Oliff PLC (57) ABSTRACT

A sulfide solid electrolyte material includes Li, K, Si, P and S elements; a peak at $2\theta=29.58°\pm0.50°$ and not having a peak at a position of $2\theta=27.33°\pm0.50°$ in X-ray diffraction measurement using a CuKα ray, or when a diffraction intensity at the peak of $2\theta=29.58°\pm0.50°$ is regarded as $I_A$ and a diffraction intensity at the peak of $2\theta=27.33°\pm0.50°$ is regarded as $I_B$ having a peak at the position of $2\theta=27.33°\pm0.50°$, a value of $I_B/I_A$ is less than 1; a P element molar fraction (P/(Si+P)) to a Si element total and the P element satisfies $0.5 \le P/(Si+P) \le 0.7$, and a K element molar fraction (K/(Li+K)) to a Li element total and the K element satisfies $0 < K/(Li+K) \le 0.1$.

6 Claims, 5 Drawing Sheets

(51) Int. Cl.
*H01B 1/10* (2006.01)
*H01M 10/0525* (2010.01)

FIG. 1

Octahedron O
(Such as LiS$_6$ and KS$_6$)

Tetrahedron T$_1$
(Such as SiS$_4$ and PS$_4$)

Tetrahedron T$_2$
(Such as PS$_4$)

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material with favorable ion conductivity.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery, namely a battery all-solidified by replacing the liquid electrolyte with a solid electrolyte layer, is conceived to intend the simplification of the safety device and be excellent in production cost and productivity for the reason that the flammable organic solvent is not used in the battery.

A sulfide solid electrolyte material is known as a solid electrolyte material used for an all solid lithium battery. For example, in Patent Literature 1, a sulfide solid electrolyte material obtained by using a raw material composition containing $Li_2S$ and a sulfide of an element of the fourteenth family or the fifteenth family (such as $P_2S_5$) is disclosed.

CITATION LIST

Patent Literature

Patent Literature 1: Japanese Patent Application Laid-Open No. 2010-199033
Patent Literature 2: WO 2011/118801

SUMMARY OF INVENTION

Technical Problem

A solid electrolyte material with favorable ion conductivity is demanded from the viewpoint of achieving higher output of a battery. The present invention has been made in view of the actual circumstances, and the main object thereof is to provide a sulfide solid electrolyte material with favorable ion conductivity.

Solution to Problem

To achieve the above object, the present invention provides a sulfide solid electrolyte material comprising a Li element, a K element, a Si element, a P element and a S element; having a peak at a position of $2\theta=29.58°\pm0.50°$ in X-ray diffraction measurement using a CuKα ray; not having a peak at a position of $2\theta=27.33°\pm0.50°$ in X-ray diffraction measurement using a CuKα ray, or when a diffraction intensity at the peak of $2\theta=29.58°\pm0.50°$ is regarded as $I_A$ and a diffraction intensity at the peak of $2\theta=27.33°\pm0.50°$ is regarded as $I_B$ in a case of having a peak at the position of $2\theta=27.33°\pm0.50°$, a value of $I_B/I_A$ being less than 1; a molar fraction (P/(Si+P)) of the P element to a total of the Si element and the P element satisfying $0.5\leq P/(Si+P)\leq0.7$; and a molar fraction (K/(Li+K)) of the K element to a total of the Li element and the K element satisfying $0<K/(Li+K)\leq0.1$.

According to the present invention, the ratio of a crystal phase having a peak in the vicinity of $2\theta=29.58°$ is so high as to allow the sulfide solid electrolyte material with favorable ion conductivity.

Also, the present invention provides a sulfide solid electrolyte material comprising an octahedron O comprising a Li element and a S element, a tetrahedron $T_1$ comprising an $M_a$ element and a S element, and a tetrahedron $T_2$ comprising an $M_b$ element and a S element, the tetrahedron $T_1$ and the octahedron O sharing an edge, and the tetrahedron $T_2$ and the octahedron O containing a crystal structure sharing a corner as a main body, at least one of the $M_a$ element and the $M_b$ element containing a Si element; at least one of the $M_a$ element and the $M_b$ element containing a P element; at least one of the octahedrons O being such that part of the Li element bonding to the S element is substituted with a K element; a molar fraction (P/(Si+P)) of the P element to a total of the Si element and the P element satisfying $0.5\leq P/(Si+P)\leq0.7$; and a molar fraction (K/(Li+K)) of the K element to a total of the Li element and the K element satisfying $0<K/(Li+K)\leq0.1$.

According to the present invention, the octahedron O, the tetrahedron $T_1$ and the tetrahedron $T_2$ have a predetermined crystal structure (a three-dimensional structure), so as to allow the sulfide solid electrolyte material with favorable ion conductivity.

Also, the present invention provides a battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material described above.

According to the present invention, the use of the sulfide solid electrolyte material allows the high-output battery.

Also, the present invention provides a producing method for a sulfide solid electrolyte material, the sulfide solid electrolyte material being the sulfide solid electrolyte material described above, comprising an ion conductive material synthesizing step of synthesizing an amorphized ion conductive material using a raw material composition containing a constituent of the sulfide solid electrolyte material by mechanical milling, and a heating step of obtaining the sulfide solid electrolyte material by heating the amorphized ion conductive material.

According to the present invention, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high to be obtained. Thus, the sulfide solid electrolyte material with favorable ion conductivity may be obtained.

Advantageous Effects of Invention

The present invention produces the effect such as to allow a sulfide solid electrolyte material with favorable ion conductivity to be obtained.

DESCRIPTION OF EMBODIMENTS

A sulfide solid electrolyte material, a battery and a producing method for a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into two embodiments. Then, the sulfide solid electrolyte material of the present invention is described while divided into a first embodiment and a second embodiment.

1. First Embodiment

A sulfide solid electrolyte material of a first embodiment comprises a Li element, a K element, a Si element, a P element and a S element, having a peak at a position of $2\theta=29.58°\pm0.50°$ in X-ray diffraction measurement using a CuKα ray, not having a peak at a position of $2\theta=27.33°\pm0.50°$ in X-ray diffraction measurement using a CuKα ray or when a diffraction intensity at the peak of $2\theta=29.58°\pm0.50°$ is regarded as $I_A$ and a diffraction intensity at the peak of $2\theta=27.33°\pm0.50°$ is regarded as $I_B$ in a case of having a peak at the position of $2\theta=27.33°\pm0.50°$, a value of $I_B/I_A$ is less than 1, and a molar fraction (P/(Si+P)) of the P element to a total of the Si element and the P element satisfies $0.5 \leq P/(Si+P) \leq 0.7$, and a molar fraction (K/(Li+K)) of the K element to a total of the Li element and the K element satisfies $0 < K/(Li+K) \leq 0.1$.

According to the first embodiment, the ratio of a crystal phase having a peak in the vicinity of $2\theta=29.58°$ is so high as to allow the sulfide solid electrolyte material with favorable ion conductivity. Here, the K element is large in atomic size as compared with the Li element. Thus, a crystal lattice expands by containing the K element. The sulfide solid electrolyte material of the first embodiment contains the Si element, which is small in atomic size, together with the K element so that it is conceived that a crystal lattice is restrained from expanding and a structure of a crystal phase having a peak in the vicinity of $2\theta=29.58°$ may be retained. In addition, in the first embodiment, the sulfide solid electrolyte material with low reduction potential may be obtained by containing the Si element. The Si element is conceived to have the property of being reduced with difficulty by reason of being small in ionic radius and making a firm bond to the S element; consequently, it is assumed that reduction potential lowers.

Here, an LiGePS-based (such as is represented by $Li_{3.25}Ge_{0.25}P_{0.75}S_4$) sulfide solid electrolyte material described in Patent Literature 2 has a peak in the vicinity of $2\theta=29.58°$ in X-ray diffraction measurement using a CuKα ray. A crystal phase having this peak is regarded as a crystal phase A. Also, the crystal phase A ordinarily has peaks at a position of $2\theta=17.38°$, $20.18°$, $20.44°$, $23.56°$, $23.96°$, $24.93°$, $26.96°$, $29.07°$, $29.58°$, $31.71°$, $32.66°$ and $33.39°$. Incidentally, these peak positions occasionally shift in a range of $\pm0.50°$ (above all a range of $\pm0.30°$, particularly a range of $\pm0.10°$) for the reason that a crystal lattice changes somewhat due to factors such as material composition. The sulfide solid electrolyte material of the first embodiment is conceived to have the same crystal phase as the crystal phase A.

Also, the LiGePS-based sulfide solid electrolyte material described in Patent Literature 2 has a peak in the vicinity of $2\theta=27.33°$ in X-ray diffraction measurement using a CuKα ray. A crystal phase having this peak is regarded as a crystal phase B. The crystal phase B is a crystal phase with lower ion conductivity than the crystal phase A described above. Also, the crystal phase B is ordinarily conceived to have peaks of $2\theta=17.46°$, $18.12°$, $19.99°$, $22.73°$, $25.72°$, $27.33°$, $29.16°$ and $29.78°$. Incidentally, also these peak positions occasionally shift in a range of $\pm0.50°$ (above all a range of $\pm0.30°$, particularly a range of $\pm0.10°$).

The sulfide solid electrolyte material of the first embodiment occasionally has the same crystal phase as the crystal phase B. In the first embodiment, in the case where diffraction intensity at a peak in the vicinity of $2\theta=29.58°$ is regarded as $I_A$ and diffraction intensity at a peak in the vicinity of $2\theta=27.33°$ is regarded as $I_B$, a value of $I_B/I_A$ is ordinarily prescribed at less than 1. Also, from the viewpoint of ion conductivity, the sulfide solid electrolyte material of the first embodiment is preferably high in the ratio of the crystal phase A with high ion conductivity. Thus, a value of $I_B/I_A$ is preferably smaller; specifically, preferably 0.55 or less, more preferably 0.45 or less, far more preferably 0.25 or less, particularly preferably 0.15 or less, extremely preferably 0.07 or less. Also, a value of $I_B/I_A$ is preferably 0. In other words, it is preferable that the sulfide solid electrolyte material of the first embodiment does not have a peak in the vicinity of $2\theta=27.33°$ as a peak of the crystal phase B.

Also, the sulfide solid electrolyte material of the first embodiment contains at least a Li element, a K element, a Si element, a P element and a S element. Here, a molar fraction (P/(Si+P)) of the P element to the total of the Si element and the P element is ordinarily 0.5 or more, above all, preferably 0.6 or more. In the case where the molar fraction is too small, that is to say, the content of the Si element is relatively too large, the atomic size of the Si element is so small that distortion of a crystal lattice is large and a narrow conduction path is formed; consequently, the reason therefor is to bring a possibility of being incapable of obtaining the sulfide solid electrolyte material with high ion conductivity. On the other hand, the molar fraction (P/(Si+P)) is ordinarily 0.7 or less, above all, preferably 0.69 or less, more preferably 0.65 or less. In the case where the molar fraction is too large, that is to say, the content of the Si element is relatively too small, a crystal lattice is not sufficiently restrained from expanding by containing the K element, and a structure of the crystal phase A described above with high ion conductivity is retained with difficulty; consequently, the reason therefor is to bring a possibility of being incapable of obtaining the sulfide solid electrolyte material. Incidentally, the molar fraction may be measured in such a manner that mass distribution is measured by ICP (high-frequency inductively coupled plasma) emission spectrometry and divided by atomic weight.

Also, in the first embodiment, a molar fraction (K/(Li+K)) of the K element to the total of the Li element and the K element is ordinarily not particularly limited if it is more than 0, and is preferably 0.01 or more, for example. In the case where the molar fraction is too small, that is to say, the content of the K element is relatively too small, distortion of a crystal lattice by containing the Si element with a small atomic size becomes larger, and a narrow conduction path is formed; consequently, the reason therefor is to bring a possibility of being incapable of obtaining the sulfide solid electrolyte material with high ion conductivity. On the other hand, the molar fraction (K/(Li+K)) is not particularly limited if it is such as to allow the crystal phase A described above to be formed; specifically, it is ordinarily 0.1 or less. Also, the molar fraction (K/(Li+K)) is preferably 0.09 or less, above all. In the case where the molar fraction is too large, that is to say, the content of the K element is relatively too large, a crystal lattice is not sufficiently restrained from expanding by containing the K element, and a structure of the crystal phase A described above with high ion conductivity is retained with difficulty; consequently, the reason therefor is to bring a possibility of being incapable of obtaining the sulfide solid electrolyte material. Incidentally, the molar fraction may be measured by using ICP (high-frequency inductively coupled plasma) emission spectrometry. Incidentally, the molar fraction may be measured in such a manner that mass distribution is measured by ICP emission spectrometry and divided by atomic weight.

Also, the sulfide solid electrolyte material of the first embodiment may comprise only a Li element, a K element, a Si element, a P element and a S element, or further contain another element. For example, in the sulfide solid electrolyte material of the first embodiment, part of the Li element is substituted with the K element, and part of the Li element may be substituted with a monovalent or divalent element. Examples of the monovalent or divalent element include at least one kind selected from the group consisting of Na, Mg, Ca and Zn. Incidentally, the amount of the monovalent or divalent element is preferably a smaller amount than the Li element and the K element.

Also, in the first embodiment, part of the Si element may be substituted with a trivalent, tetravalent or pentavalent element. Similarly, part of the P element may be substituted with a trivalent, tetravalent or pentavalent element. Examples of the trivalent, tetravalent or pentavalent element include at least one kind selected from the group consisting of Sb, Ge, Sn, B, Al, Ga, In, Ti, Zr, V and Nb. Incidentally, the amount of the trivalent, tetravalent or pentavalent element is preferably a smaller amount than the Si element or the P element; particularly, it is preferable that the sulfide solid electrolyte material does not contain Ge.

Also, the composition of the sulfide solid electrolyte material of the first embodiment is not particularly limited if the composition is a composition such as to have a Li element, a K element, a Si element, a P element and a S element and to allow a value of $I_B/I_A$, a value of (P/(Si+P)) and a value of (K/(Li+K)) to be within a predetermined range, but the composition is preferably represented by $(Li_{1-\delta}K_\delta)_{(4-x)}Si_{(1-x)}P_xS_4$ (x satisfies $0.5 \leq x \leq 0.7$ and $\delta$ satisfies $0 < \delta \leq 0.1$). The reason therefor is to allow the sulfide solid electrolyte material with high ion conductivity. Here, a composition of $Li_{(4-x)}Si_{(1-x)}P_xS_4$ not having the K element corresponds to a composition of a solid solution of $Li_3PS_4$ and $Li_4SiS_4$. That is to say, this composition corresponds to a composition on a tie line of $Li_3PS_4$ and $Li_4SiS_4$. Incidentally, both $Li_3PS_4$ and $Li_4SiS_4$ correspond to an ortho-composition and have the advantage that chemical stability is high.

Also, x in $(Li_{1-\delta}K_\delta)_{(4-x)}Si_{(1-x)}P_xS_4$ is not particularly limited if the x is a value such as to allow a predetermined value of $I_B/I_A$, but, above all, the x satisfies preferably $0.55 \leq x$, more preferably $0.6 \leq x$. On the other hand, the x satisfies preferably $x \leq 0.7$, more preferably $x \leq 0.65$. The reason therefor is to allow the sulfide solid electrolyte material with further favorable ion conductivity.

Also, the reduction potential of the sulfide solid electrolyte material of the first embodiment is, for example, preferably 1.0 V (vs Li/Li$^+$) or less, more preferably 0.5 V (vs Li/Li+) or less.

The sulfide solid electrolyte material of the first embodiment is ordinarily a sulfide solid electrolyte material with crystallinity. Also, the sulfide solid electrolyte material of the first embodiment is preferably high in ion conductivity, and ion conductivity of the sulfide solid electrolyte material at 25° C. is preferably 0.0001 S/cm or more, more preferably 0.001 S/cm or more, far more preferably 0.01 S/cm or more. Also, the shape of the sulfide solid electrolyte material of the first embodiment is not particularly limited but examples thereof include a powdery shape. In addition, the average particle diameter of the powdery sulfide solid electrolyte material is preferably within a range of 0.1 μm to 50 μm, for example.

The sulfide solid electrolyte material of the first embodiment has so high ion conductivity as to be capable of being used for optional uses in which ion conductivity is required. Above all, the sulfide solid electrolyte material of the first embodiment is preferably used for a battery. The reason therefor is to be capable of greatly contributing to achieving higher output of a battery. Also, a producing method for the sulfide solid electrolyte material of the first embodiment is described in detail in the after-mentioned 'C. Producing method for sulfide solid electrolyte material'. Also, the sulfide solid electrolyte material of the first embodiment may have characteristics of the after-mentioned second embodiment together.

2. Second Embodiment

Next, a second embodiment of a sulfide solid electrolyte material of the present invention is described. The sulfide solid electrolyte material of the second embodiment comprises an octahedron O comprising a Li element and a S element, a tetrahedron $T_1$ comprising an $M_a$ element and a S element, and a tetrahedron $T_2$ comprising an $M_b$ element and a S element, in which the tetrahedron $T_1$ and the octahedron O share an edge, and the tetrahedron $T_2$ and the octahedron O contain a crystal structure sharing a corner as the main body, at least one of the $M_a$ element and the $M_b$ element contains a Si element, at least one of the $M_a$ element and the $M_b$ element contains a P element, at least one of the octahedrons O is such that part of the Li element bonding to the S element is substituted with a K element, a molar fraction (P/(Si+P)) of the P element to a total of the Si element and the P element satisfies $0.5 \leq P/(Si+P) \leq 0.7$, and a molar fraction (K/(Li+K)) of the K element to a total of the Li element and the K element satisfies $0 < K/(Li+K) \leq 0.1$.

According to the second embodiment, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the sulfide solid electrolyte material with low reduction potential may be obtained by containing the Si element.

Figure 1:
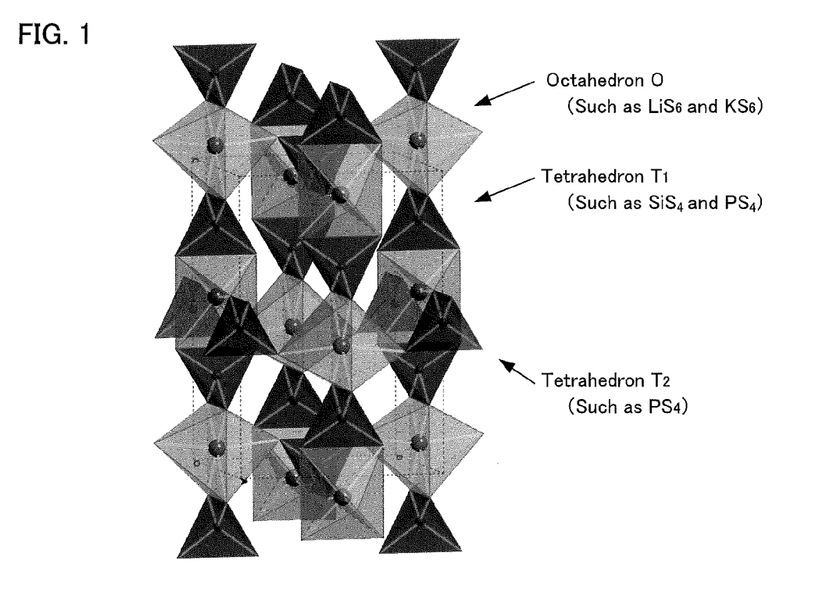
FIG. 1 is a perspective view explaining an example of a crystal structure of a sulfide solid electrolyte material of the present invention.

FIG. 1 is a perspective view explaining an example of a crystal structure of the sulfide solid electrolyte material of the second embodiment. In the crystal structure shown in FIG. 1, the octahedron O has Li and K as the central element, and has six pieces of S at the corner of the octahedron; typically, the octahedron O is $LiS_6$ octahedron and $KS_6$ octahedron. The tetrahedron $T_1$ has $M_a$ as the central element, and has four pieces of S at the corner of the tetrahedron; typically, the tetrahedron $T_1$ is $SiS_4$ tetrahedron and $PS_4$ tetrahedron. The tetrahedron $T_2$ has $M_b$ as the central element, and has four pieces of S at the corner of the tetrahedron; typically, the tetrahedron $T_2$ is $PS_4$ tetrahedron. In addition, the tetrahedron $T_1$ and the octahedron O share an edge, and the tetrahedron $T_2$ and the octahedron O share a corner.

The sulfide solid electrolyte material of the second embodiment is greatly characterized by including the crystal structure as the main body. The ratio of the crystal structure in the whole crystal structure of the sulfide solid electrolyte material is not particularly limited but is preferably higher. The reason therefor is to allow the sulfide solid electrolyte material with high ion conductivity. The ratio of the crystal structure is, specifically, preferably 70 wt % or more, more preferably 90 wt % or more. Incidentally, the ratio of the crystal structure may be measured by radiated light XRD, for example. In particular, the sulfide solid electrolyte material of the second embodiment is preferably a single-phase material of the crystal structure. The reason therefor is to allow ion conductivity to be extremely heightened.

Incidentally, the $M_a$ element, the $M_b$ element and other items in the second embodiment are the same as the first embodiment described above; therefore, the description herein is omitted.

B. Battery

Next, a battery of the present invention is described. The battery of the present invention is a battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material described above.

According to the present invention, the use of the sulfide solid electrolyte material allows the high-output battery.

Figure 2:
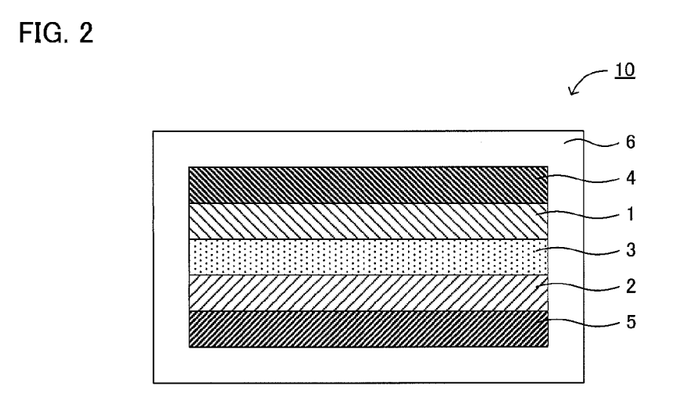
FIG. 2 is a schematic cross-sectional view illustrating an example of a battery of the present invention.

FIG. 2 is a schematic cross-sectional view illustrating an example of the battery of the present invention. A battery 10 in FIG. 2 has a cathode active material layer 1 containing a cathode active material, an anode active material layer 2 containing an anode active material, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. In the present invention, it is greatly characterized in that at least one of the cathode active material layer 1, the anode active material layer 2 and the electrolyte layer 3 contains the sulfide solid electrolyte material described in the 'A. Sulfide solid electrolyte material'. Above all, in the present invention, the sulfide solid electrolyte material contained in the anode active material layer 2 or the electrolyte layer 3 preferably contacts with the anode active material. The reason therefor is that the sulfide solid electrolyte material is so low in reduction potential as to bring the advantages that the range of selections of the usable anode active material extends as compared with the case of using the sulfide solid electrolyte material not containing Si, and that the use of the anode active material with low action potential increases battery voltage.

The battery of the present invention is hereinafter described in each constitution.

1. Anode Active Material Layer

The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the sulfide solid electrolyte material described above. The reason therefor is that the sulfide solid electrolyte material is so low in reduction potential that the range of selections of the usable anode active material extends as compared with the case of using the sulfide solid electrolyte material not containing Si. The ratio of the sulfide solid electrolyte material contained in the anode active material layer varies with kinds of a battery but is preferably, for example, within a range of 0.1% by volume to 80% by volume, above all, within a range of 1% by volume to 60% by volume, particularly, within a range of 10% by volume to 50% by volume. Also, examples of an anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. In particular, in the present invention, it is preferable that the anode active material layer contains the sulfide solid electrolyte material, and action potential (electric potential in which an insertion reaction of Li ions is caused) of the anode active material is higher than reduction potential of the sulfide solid electrolyte material.

The anode active material layer may further contain a conductive material. The addition of the conductive material allows conductivity of the anode active material layer to be improved. Examples of the conductive material include acetylene black, Ketjen Black and carbon fiber. Also, the anode active material layer may contain a binder. Examples of kinds of the binder include a fluorine-containing binder such as polyvinylidene fluoride (PVDF). Also, the thickness of the anode active material layer is preferably within a range of 0.1 μm to 1000 μm, for example.

2. Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer comprising a solid electrolyte material. The reason therefor is to allow the battery with high safety as compared with a battery using a liquid electrolyte. In addition, in the present invention, a solid electrolyte layer preferably contains the sulfide solid electrolyte material described above. The ratio of the sulfide solid electrolyte material contained in a solid electrolyte layer is preferably, for example, within a range of 10% by volume to 100% by volume, above all, within a range of 50% by volume to 100% by volume. The thickness of a solid electrolyte layer is preferably within a range of 0.1 μm to 1000 μm, for example, and within a range of 0.1 μm to 300 μm, above all. Also, examples of a method for forming a solid electrolyte layer include a method for compression-molding a solid electrolyte material.

Also, the electrolyte layer in the present invention may be a layer comprising a liquid electrolyte. The case of using a liquid electrolyte allows the higher-output battery though safety needs to be further considered as compared with the case of using a solid electrolyte layer. Also, in this case, ordinarily, at least one of the cathode active material layer and the anode active material layer contains the sulfide solid electrolyte material described above. A liquid electrolyte ordinarily contains a lithium salt and an organic solvent (a nonaqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the organic solvent include ethylene carbonate (EC), propylene carbonate (PC), dimethyl carbonate (DMC), diethyl carbonate (DEC), ethylmethyl carbonate (EMC) and butylene carbonate (BC).

3. Cathode Active Material Layer

The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the sulfide solid electrolyte material described above. The ratio of the sulfide solid electrolyte material contained in the cathode active material layer varies with kinds of a battery but is preferably, for example, within a range of 0.1% by volume to 80% by volume, above all, within a range of 1% by volume to 60% by volume, particularly, within a range of 10% by volume to 50% by volume. Also, examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$. Incidentally, a conductive material and a binder used for the cathode active material layer are the same as the case of the anode active material layer described above. Also, the thickness of the cathode active material layer is preferably within a range of 0.1 µm to 1000 µm, for example.

4. Other Constitutions

The battery of the present invention has at least the anode active material layer, the electrolyte layer and the cathode active material layer described above, ordinarily further having a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, the thickness and the shape of the cathode current collector and the anode current collector are preferably selected properly in accordance with uses of a battery. Also, a battery case of a general battery may be used for a battery case used for the present invention. Examples of the battery case include a battery case made of SUS.

5. Battery

The battery of the present invention may be a primary battery or a secondary battery, preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method is a method such as to allow the battery described above to be obtained, and the same method as a producing method for a general battery may be used. For example, in the case where the battery of the present invention is an all solid state battery, examples of a producing method therefor include a method such that a material comprising a cathode active material layer, a material comprising a solid electrolyte layer and a material comprising an anode active material layer are sequentially pressed to thereby produce a power generating element and this power generating element is stored inside a battery case, which is crimped.

C. Producing Method for Sulfide Solid Electrolyte Material

Next, a producing method for a sulfide solid electrolyte material of the present invention is described. The producing method for a sulfide solid electrolyte material of the present invention is a producing method for the sulfide solid electrolyte material described above, comprising steps of: an ion conductive material synthesizing step of synthesizing an amorphized ion conductive material using a raw material composition containing a constituent of the sulfide solid electrolyte material by mechanical milling, and a heating step of obtaining the sulfide solid electrolyte material by heating the amorphized ion conductive material.

According to the present invention, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high to be obtained. Thus, the sulfide solid electrolyte material with favorable ion conductivity may be obtained. In addition, the sulfide solid electrolyte material with low reduction potential may be obtained by containing the Si element.

Figure 3:
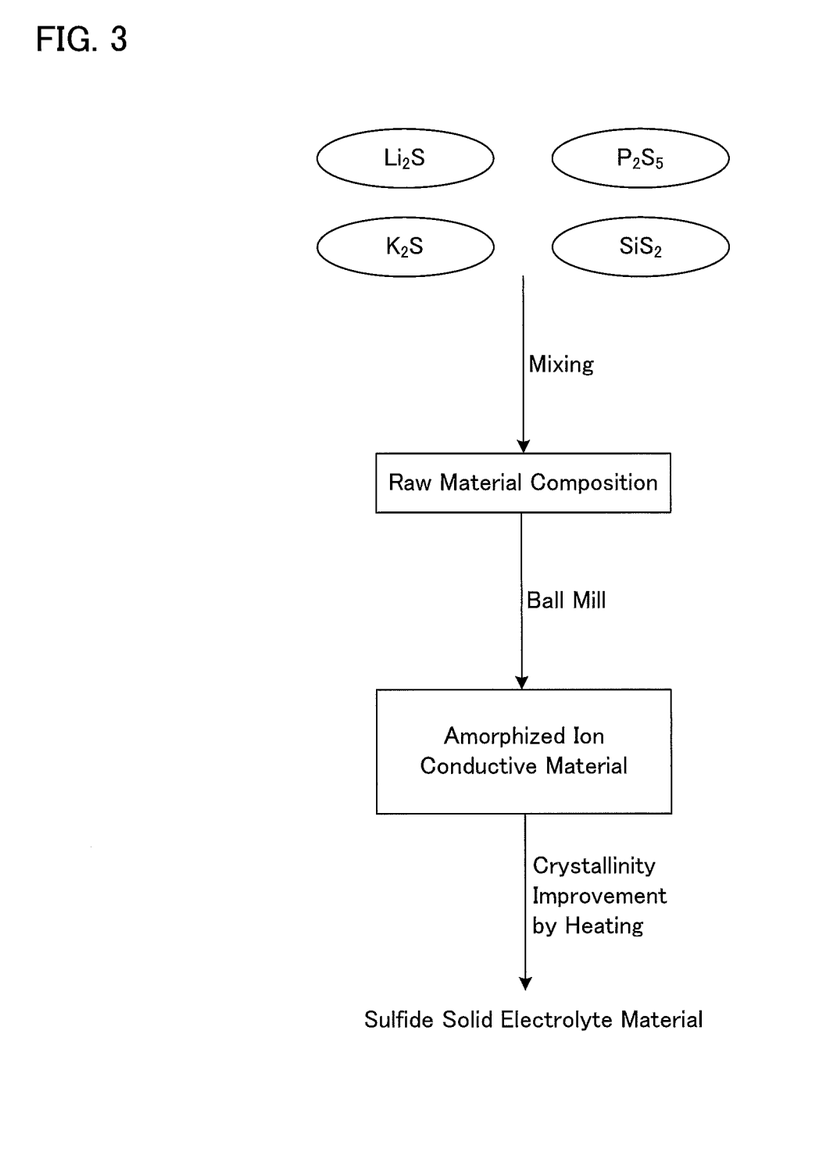
FIG. 3 is an explanatory view illustrating an example of a producing method for a sulfide solid electrolyte material of the present invention.
Figure 4A:
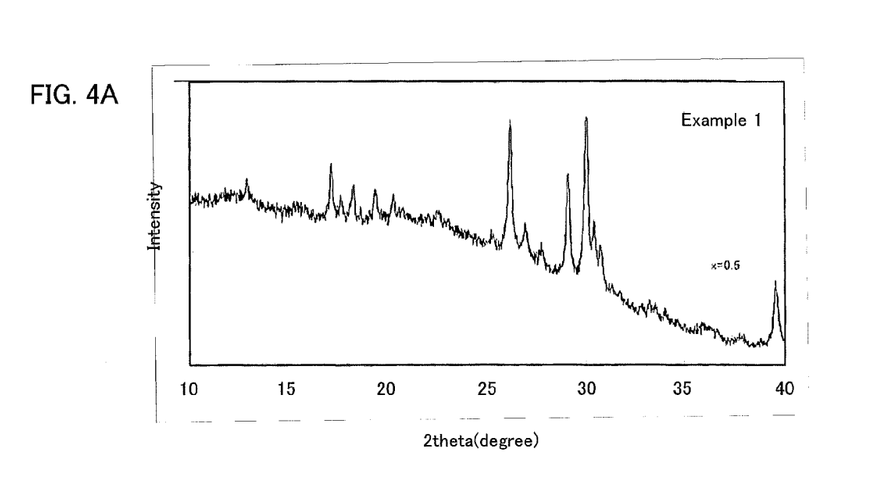
FIGS. 4A and 4B are X-ray diffraction spectra of a sulfide solid electrolyte material obtained in Examples 1 and 2.
Figure 4B:
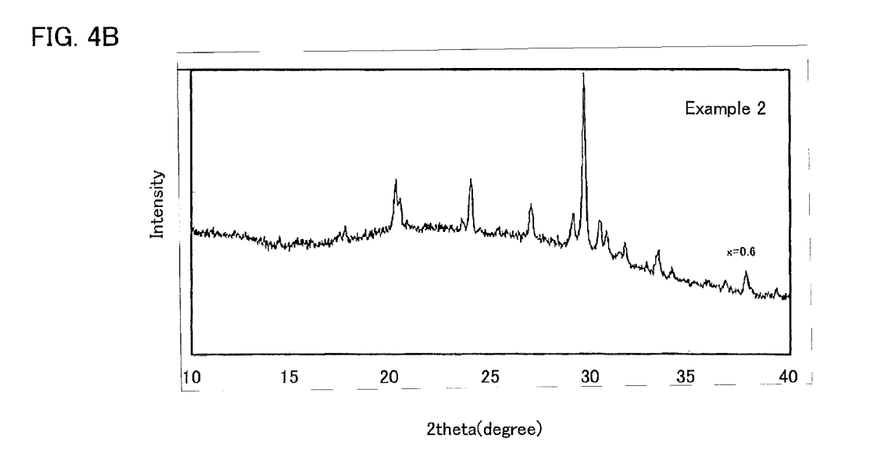
Figure 5A:
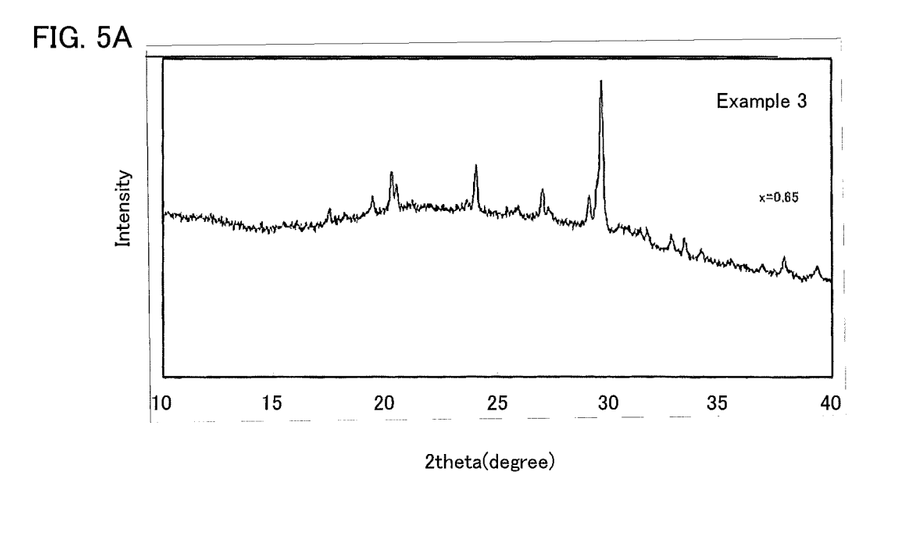
FIGS. 5A and 5B are X-ray diffraction spectra of a sulfide solid electrolyte material obtained in Examples 3 and 4.
Figure 5B:
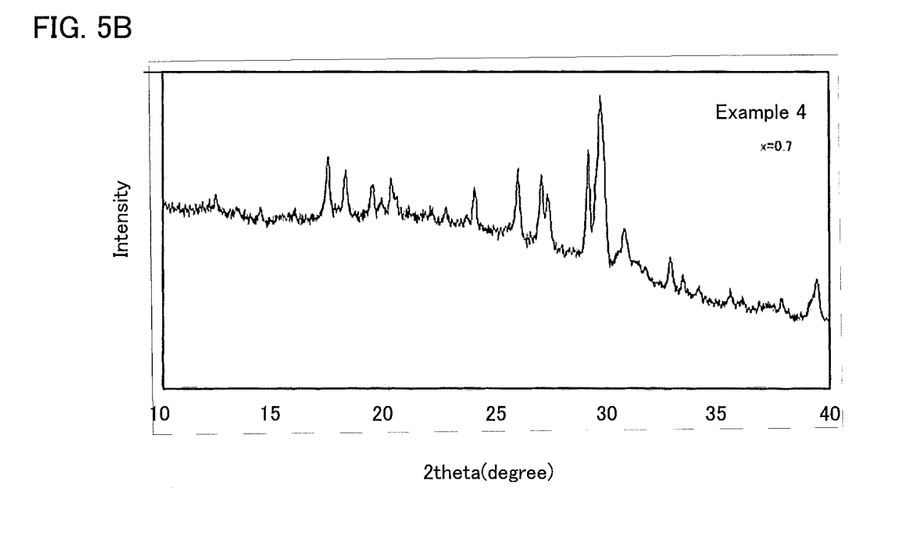

FIG. 3 is an explanatory view illustrating an example of the producing method for the sulfide solid electrolyte material of the present invention. In the producing method for the sulfide solid electrolyte material in FIG. 3, first, a raw material composition is produced by mixing $Li_2S$, $P_2S_5$, $SiS_2$ and $K_2S$. On this occasion, in order to prevent the raw material composition from deteriorating due to moisture in the air, the raw material composition is preferably produced under an inert gas atmosphere. Next, ball mill is performed for the raw material composition to obtain an amorphized ion conductive material. Next, the amorphized ion conductive material is heated for improving crystallinity to thereby obtain a sulfide solid electrolyte material.

The present invention allows the sulfide solid electrolyte material such that the ratio of a crystal phase having a peak in the vicinity of $2\theta=29.58°$ is high to be obtained; below, the reason therefor is described. In the present invention, the amorphized ion conductive material is once synthesized unlike a solid-phase method as a conventional synthesis method. Thus, it is conceived that an environment such that the crystal phase A with high ion conductivity (the crystal phase having a peak in the vicinity of $2\theta=29.58°$) is easily precipitated is brought and the crystal phase A may be precipitated positively by the heating step thereafter. The reason why an environment such that the crystal phase A is easily precipitated is brought by amorphizing is not completely clear, but it is conceived that there is a possibility that a solution range in the ion conductive material is changed by mechanical milling and an environment such that the crystal phase A is precipitated with difficulty changes to an environment such that the crystal phase A is easily precipitated.

The producing method for the sulfide solid electrolyte material of the present invention is hereinafter described in each step.

1. Ion Conductive Material Synthesizing Step

First, an ion conductive material synthesizing step in the present invention is described. The ion conductive material synthesizing step in the present invention is a step of synthesizing an amorphized ion conductive material using a raw material composition containing a constituent of the sulfide solid electrolyte material by mechanical milling.

The raw material composition in the present invention contains at least a Li element, a K element, a Si element, a P element and a S element. Also, the raw material composition may contain the other elements described above. Examples of a compound containing the Li element include a sulfide of Li. Specific examples of the sulfide of Li include $Li_2S$. Also, examples of a compound containing the K element include a sulfide of K. Specific examples of the sulfide of K include $K_2S$.

Examples of a compound containing the Si element include a simple substance of Si and a sulfide of Si. Specific examples of the sulfide of Si include $SiS_2$ and $Li_4SiS_4$. Also, examples of a compound containing the P element include a simple substance of P and a sulfide of P. Specific examples of the sulfide of P include $P_2S_5$ and $Li_3PS_4$. Also, a simple substance and a sulfide may be used for other elements used for the raw material composition.

Mechanical milling is a method for grinding a test sample while applying mechanical energy thereto. In the present invention, an amorphized ion conductive material is synthesized by applying mechanical energy to the raw material composition. Examples of such mechanical milling include vibrating mill, ball mill, turbo mill, mechano-fusion and disk mill; among them, vibrating mill and ball mill are preferable.

The conditions of vibrating mill are not particularly limited if the conditions are such as to allow an amorphized ion conductive material to be obtained. The vibration amplitude of vibrating mill is preferably, for example, within a range of 5 mm to 15 mm, above all, within a range of 6 mm to 10 mm. The vibration frequency of vibrating mill is preferably, for example, within a range of 500 rpm to 2000 rpm, above all, within a range of 1000 rpm to 1800 rpm. The filling factor of a test sample of vibrating mill is preferably, for example, within a range of 1% by volume to 80% by volume, above all, within a range of 5% by volume to 60% by volume, particularly, within a range of 10% by volume to 50% by volume. Also, a vibrator (such as a vibrator made of alumina) is preferably used for vibrating mill.

The conditions of ball mill are not particularly limited if the conditions are such as to allow an amorphized ion conductive material to be obtained. Generally, larger number of revolutions brings higher production rate of the ion conductive material, and longer treating time brings higher conversion ratio of the raw material composition into the ion conductive material. The number of weighing table revolutions in performing planetary ball mill is preferably within a range of 200 rpm to 500 rpm, for example, and within a range of 250 rpm to 400 rpm, above all. Also, the treating time in performing planetary ball mill is preferably within a range of 1 hour to 100 hours, for example, and within a range of 1 hour to 70 hours, above all.

Incidentally, in the present invention, the amorphized ion conductive material is preferably synthesized so as to bring an environment such that the crystal phase having a peak in the vicinity of $2\theta=29.58°$ is easily precipitated.

2. Heating Step

The heating step in the present invention is a step of obtaining the sulfide solid electrolyte material by heating the amorphized ion conductive material.

In the present invention, the improvement of crystallinity is intended by heating the amorphized ion conductive material. This heating allows the crystal phase A with high ion conductivity (the crystal phase having a peak in the vicinity of $2\theta=29.58°$) to be precipitated positively.

The heating temperature in the present invention is not particularly limited if the heating temperature is a temperature such as to allow a desired sulfide solid electrolyte material to be obtained, but is preferably a temperature of crystallization temperature or more of the crystal phase A (the crystal phase having a peak in the vicinity of $2\theta=29.58°$). Specifically, the heating temperature is preferably 300° C. or more, more preferably 350° C. or more, far more preferably 400° C. or more, particularly preferably 450° C. or more. On the other hand, the heating temperature is preferably 1000° C. or less, more preferably 700° C. or less, far more preferably 650° C. or less, particularly preferably 600° C. or less. Also, the heating time is preferably adjusted properly so as to allow a desired sulfide solid electrolyte material to be obtained. Also, heating in the present invention is preferably performed under an inert gas atmosphere or in a vacuum from the viewpoint of preventing oxidation. Also, the sulfide solid electrolyte material obtained by the present invention is the same as the contents described in the 'A. Sulfide solid electrolyte material'; therefore, the description herein is omitted.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while illustrating examples hereinafter.

Example 1

Lithium sulfide ($Li_2S$, manufactured by Nippon Chemical Industrial Co., Ltd.), phosphorus pentasulfide ($P_2S_5$, manufactured by Sigma-Aldrich Co. LLC.), silicon sulfide ($SiS_2$, manufactured by Alfa Aeser) and potassium sulfide ($K_2S$, manufactured by Kojundo Chemical Lab. Co., Ltd.) were used as a starting material. These powders were mixed in a glove box under an argon atmosphere at the ratio shown in the following Table 1 to obtain a raw material composition. Next, 1 g of the raw material composition was put in a pot made of zirconia (45 ml) together with zirconia ball (10 mm $\phi$, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductive material was obtained.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated from room temperature to 550° C. taking 6 hours, maintained at 550° C. for 8 hours, and thereafter slowly cooled to room temperature. Thus, a sulfide solid electrolyte material having a composition of $(Li_{9.95}K_{0.05})_{3.5}Si_{0.5}P_{0.5}S_4$ was obtained. Incidentally, the composition corresponds to a composition of x=0.5 and δ=0.05 in $(Li_{1-\delta}K_\delta)_{4-x}Si_{1-x}P_xS_4$.

Examples 2 to 4

A sulfide solid electrolyte material was obtained in the same manner as Example 1 except for modifying the ratio of the raw material composition into the ratio shown in the following Table 1.

[Evaluations]

(X-ray Diffraction Measurement)

X-ray diffraction (XRD) measurement was performed using the sulfide solid electrolyte material obtained in Examples 1 to 4. XRD measurement was performed for a powder sample under an inert atmosphere on the conditions of using a CuKα ray. The results are shown in FIGS. 4A, 4B, 5A and 5B. As shown in FIGS. 4A, 4B, 5A and 5B, in Examples 1 to 4, it was confirmed that the crystal phase A described above was formed. Also, it was confirmed that a value of $I_B/I_A$ in Examples 1 to 4 was less than 1.

TABLE 1

|  | Example 1 | Example 2 | Example 3 | Example 4 |
|---|---|---|---|---|
| $Li_2S$ | 0.432998 | 0.416628 | 0.408559 | 0.400565 |
| $K_2S$ | 0.054693 | 0.052625 | 0.051606 | 0.050596 |
| $P_2S_5$ | 0.314988 | 0.374391 | 0.403671 | 0.432676 |
| $SiS_2$ | 0.197321 | 0.156356 | 0.136164 | 0.116162 |
| x | 0.5 | 0.6 | 0.65 | 0.7 |
| δ | 0.05 | 0.05 | 0.05 | 0.05 |

(X-ray Structural Analysis)

The crystal structure of the sulfide solid electrolyte material obtained in Example 1 was identified by X-ray structural analysis. The crystal system and crystallographic group were determined by a direct method on the basis of a diffraction pattern obtained in XRD to thereafter identify the crystal structure by a real space method. As a result, it was confirmed that the sulfide solid electrolyte material had the crystal structure as shown in FIG. 1. That is to say, the crystal structure was such that the tetrahedron $T_1$ and the octahedron O shared an edge, and the tetrahedron $T_2$ and the octahedron O shared a corner.

(Li Ion Conductance Measurement)

Figure 6:
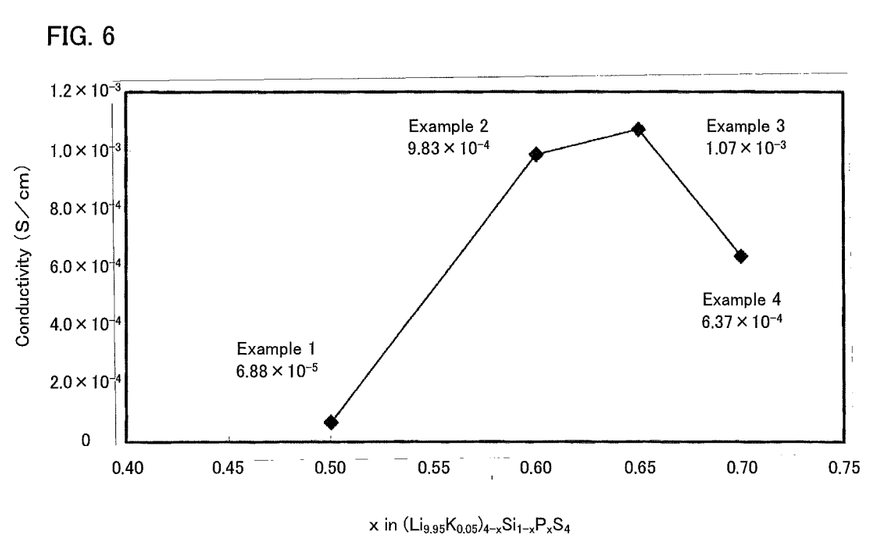
FIG. 6 is a result of measuring Li ion conductance of a sulfide solid electrolyte material obtained in Examples 1 to 4.

Li ion conductance at a temperature of 25° C. was measured using the sulfide solid electrolyte material obtained in Examples 1 to 4. First, the sulfide solid electrolyte material was weighed to 200 mg, put in a cylinder made of macole, and pressed at a pressure of 4 ton/cm². Both edges of the obtained pellets were held between a pin made of SUS, and confining pressure was applied to the pellets by bolting to obtain an evaluation cell. Li ion conductance was calculated by an alternating current impedance method in a state of maintaining the evaluation cell at a temperature of 25° C. Solartron 1260™ was used for the measurement, and impressed voltage was determined at 5 mV and measuring frequency band was determined at 0.01 to 1 MHz. The results are shown in FIG. 6. As shown in FIG. 6, it was confirmed that the sulfide solid electrolyte material obtained in Examples 1 to 4 exhibited ion conductivity. Above all, it was confirmed that the sulfide solid electrolyte material obtained in Example 3 (x=0.65 and δ=0.05) exhibited particularly high ion conductivity. Thus, in the sulfide solid electrolyte material obtained in Examples 1 to 4, it is conceived that the expansion of a crystal lattice caused by containing K, which is larger in atomic size than Li, is restrained by containing Si, which is small in atomic size, and consequently, a crystal structure of the crystal phase A described above is retained. Above all, in the composition of Example 3 (x=0.65 and δ=0.05), it is conceived that a conduction path suitable for ion conduction is formed and the sulfide solid electrolyte material with particularly favorable ion conductivity is obtained.

REFERENCE SIGNS LIST 1 cathode active material layer
2 anode active material layer
3 electrolyte layer
4 cathode current collector
5 anode current collector
6 battery case
10 battery

What is claimed is:

1. A sulfide solid electrolyte material comprising: a Li element, a K element, a Si element, a P element and a S element;
   having a peak at a position of 2θ=29.58°±0.50° in X-ray diffraction measurement using a CuKα ray;
   not having a peak at a position of 2θ=27.33°±0.50° in X-ray diffraction measurement using a CuKα ray, or when a diffraction intensity at the peak of 2θ=29.58°±0.50° is regarded as $I_A$ and a diffraction intensity at the peak of 2θ=27.33°±0.50° is regarded as $I_B$ in a case of having the peak at the position of 2θ=27.33°±0.50°, a value of $I_B/I_A$ being less than 1;
   a molar fraction (P/(Si+P)) of the P element to a total of the Si element and the P element satisfying 0.5≤P/(Si+P)≤0.7; and
   a molar fraction (K/(Li+K)) of the K element to a total of the Li element and the K element satisfying 0.05≤K/(Li+K)≤0.1.

2. A sulfide solid electrolyte material comprising: an octahedron O comprising a Li element and a S element, a tetrahedron $T_1$ comprising an $M_a$ element and a S element, and a tetrahedron $T_2$ comprising an $M_b$ element and a S element, the tetrahedron $T_1$ and the octahedron O sharing an edge, and the tetrahedron $T_2$ and the octahedron O containing a crystal structure sharing a corner as a main body,
   at least one of the $M_a$ element and the $M_b$ element containing a Si element;
   at least one of the $M_a$ element and the $M_b$ element containing a P element;
   at least one of the octahedrons O is such that part of the Li element bonding to the S element being substituted with a K element;
   a molar fraction (P/(Si+P)) of the P element to a total of the Si element and the P element satisfying 0.5≤P/(Si+P)≤0.7; and
   a molar fraction (K/(Li+K)) of the K element to a total of the Li element and the K element satisfying 0.05<K/(Li+K)≤0.1.

3. A battery comprising a cathode active material layer containing a cathode active material, an anode active material layer containing an anode active material, and an electrolyte layer formed between the cathode active material layer and the anode active material layer,
   wherein at least one of the cathode active material layer, the anode active material layer and the electrolyte layer contains the sulfide solid electrolyte material according to claim 1.

4. A battery comprising a cathode active material layer containing a cathode active material, an anode active material layer containing an anode active material, and an electrolyte layer formed between the cathode active material layer and the anode active material layer,
- wherein at least one of the cathode active material layer, the anode active material layer and the electrolyte layer contains the sulfide solid electrolyte material according to claim 2.

5. A producing method for a sulfide solid electrolyte material, the sulfide solid electrolyte material being the sulfide solid electrolyte material according to claim 1, comprising steps of:
- an ion conductive material synthesizing step of synthesizing an amorphized ion conductive material using a raw material composition containing a constituent of the sulfide solid electrolyte material by mechanical milling; and
- a heating step of obtaining the sulfide solid electrolyte material by heating the amorphized ion conductive material.

6. A producing method for a sulfide solid electrolyte material, the sulfide solid electrolyte material being the sulfide solid electrolyte material according to claim 2, comprising steps of:
- an ion conductive material synthesizing step of synthesizing an amorphized ion conductive material using a raw material composition containing a constituent of the sulfide solid electrolyte material by mechanical milling; and
- a heating step of obtaining the sulfide solid electrolyte material by heating the amorphized ion conductive material.

* * * * *